United States Patent [19]
Heymsfield et al.

[11] Patent Number: 5,276,453
[45] Date of Patent: Jan. 4, 1994

[54] METHOD FOR AMBIGUITY RESOLUTION IN RANGE-DOPPLER MEASUREMENTS

[75] Inventors: Gerald M. Heymsfield, Gaithersburg, Md.; Lee S. Miller, Central, S.C.

[73] Assignee: The United States of America as represented by the Administrator of the National Aeronautics and Space Administration, Washington, D.C.

[21] Appl. No.: 28,091

[22] Filed: Feb. 2, 1993

[51] Int. Cl.⁵ ............................................... G01S 13/58
[52] U.S. Cl. ...................................... 342/112; 342/116
[58] Field of Search ......................... 342/109, 112, 116

[56] References Cited

U.S. PATENT DOCUMENTS

| | | | |
|---|---|---|---|
| 3,742,437 | 6/1973 | Thiele | 342/116 X |
| 3,863,253 | 1/1975 | Kiyoto et al. | 342/112 X |
| 4,302,758 | 11/1981 | Tomasi | 342/109 X |
| 5,136,298 | 8/1992 | Williams | 342/112 X |

*Primary Examiner*—T. H. Tubbesing
*Attorney, Agent, or Firm*—Paul S. Clohan, Jr.; R. Dennis Marchant; Guy M. Miller

[57] ABSTRACT

A method for resolving range and doppler target ambiguities when the target has substantial range or has a high relative velocity in which a first signal is generated and a second signal is also generated which is coherent with the first signal but at a slightly different frequency such that there exists a difference in frequency between these two signals of $\Delta f_t$. The first and second signals are converted into a dual-frequency pulsed signal, amplified, and the dual-frequency pulsed signal is transmitted towards a target. A reflected dual-frequency signal is received from the target, amplified, and changed to an intermediate dual-frequency signal. The intermediate dual-frequency signal is amplified, with extracting of a shifted difference frequency $\Delta f_r$ from the amplified intermediate dual-frequency signal done by a non-linear detector. The final step is generating two quadrature signals from the difference frequency $\Delta f_t$ and the shifted difference frequency $\Delta f_r$ and processing the two quadrature signals to determine range and doppler information of the target.

6 Claims, 2 Drawing Sheets

METHOD FOR AMBIGUITY RESOLUTION IN RANGE-DOPPLER MEASUREMENTS

ORIGIN OF THE INVENTION

The invention described herein was jointly made by an employee of the United States Government, and may be manufactured and used by or for the Government for governmental purposes without the payment of any royalties thereon or therefor.

TECHNICAL FIELD

This invention relates to a method of obtaining velocity information from radar, sonar, laser, or other similar devices and more particularly to situations involving moving platforms (or relative motion) and very high radar frequencies for which conventional Doppler methods are difficult or impractical.

BACKGROUND ART

Difficulties arise with high frequency radar when range and velocity are both to be measured, and when either the radar or target has substantial range or velocity. This is the so-called range-Doppler ambiguity. For example, for measurements from an earth orbiting platform at an orbital altitude of about 800 km, the platform velocities are about 7kms$^{-1}$, and the two-way time delay for echoes directly beneath the satellite and near the earth's surface will be about 5 ms; however, for a radar transmitting at a frequency of 10,000 MHz, the Doppler shift of a return measured from a radar on the orbiting platform would be on the order of 0.5 MHz. The maximum unambiguous frequency measured by this radar with a pulse-repetition-frequency (PRF) equal to the inverse of the 5 ms ranging time would be 100 Hz. Thus the PRF needed for ranging cannot fully sample the Doppler shift. In radar parlance, the velocity information is "aliased" and ambiguous. Also, since the radar antenna beamwidth causes spreading of the width of the Doppler spectrum, it is possible for this spread to equal or exceed the spacing between Doppler ambiguities, making velocity measurement difficult or impossible.

An example of the need for ambiguity resolution is the case of a 100 GHz wind-velocity sensing satellite radar. Assuming that nadir and forward-looking measurements are needed to sense the velocity components, then for a 30 degree forward angle, the Doppler shift for a 7 km/sec ground-track velocity is about 2.3 MHz. The Doppler bandwidth for a 0.8M antenna would be about 20 kHz. Therefore, for any reasonable PRF, the felocity data is heavily aliased and the spectral expanse of the signal is comparable to the Nyquist interval.

STATEMENT OF THE INVENTION

It is therefore an object of the present invention to provide a method for resolving range and doppler ambiguities in radars/sonars/lidars when either the radar/sonar/lidar or target has substantial range and/or velocity.

Another object of the present invention is to provide a method that will use the frequency sensitivity of the radar target to infer other target properties such as target size or the presence of compact targets immersed in diffuse returns.

These and other objects are achieved by providing a method for ambiguity resolution in range-doppler measurements in which two closely-spaced coherent signals are transmitted and the Doppler information is extracted from the difference frequency between the two signals. The two signals are spaced so closely that it is not practical to separately filter each of the two (or more) signals, since the frequency spectrum arising from the pulse modulation exceeds the difference frequency. However, small frequency differences equate to some degree of coherence, and if the two signals are coherent, instantaneous Doppler information can be extracted.

DETAILED DESCRIPTION OF THE INVENTION

Figure 1:
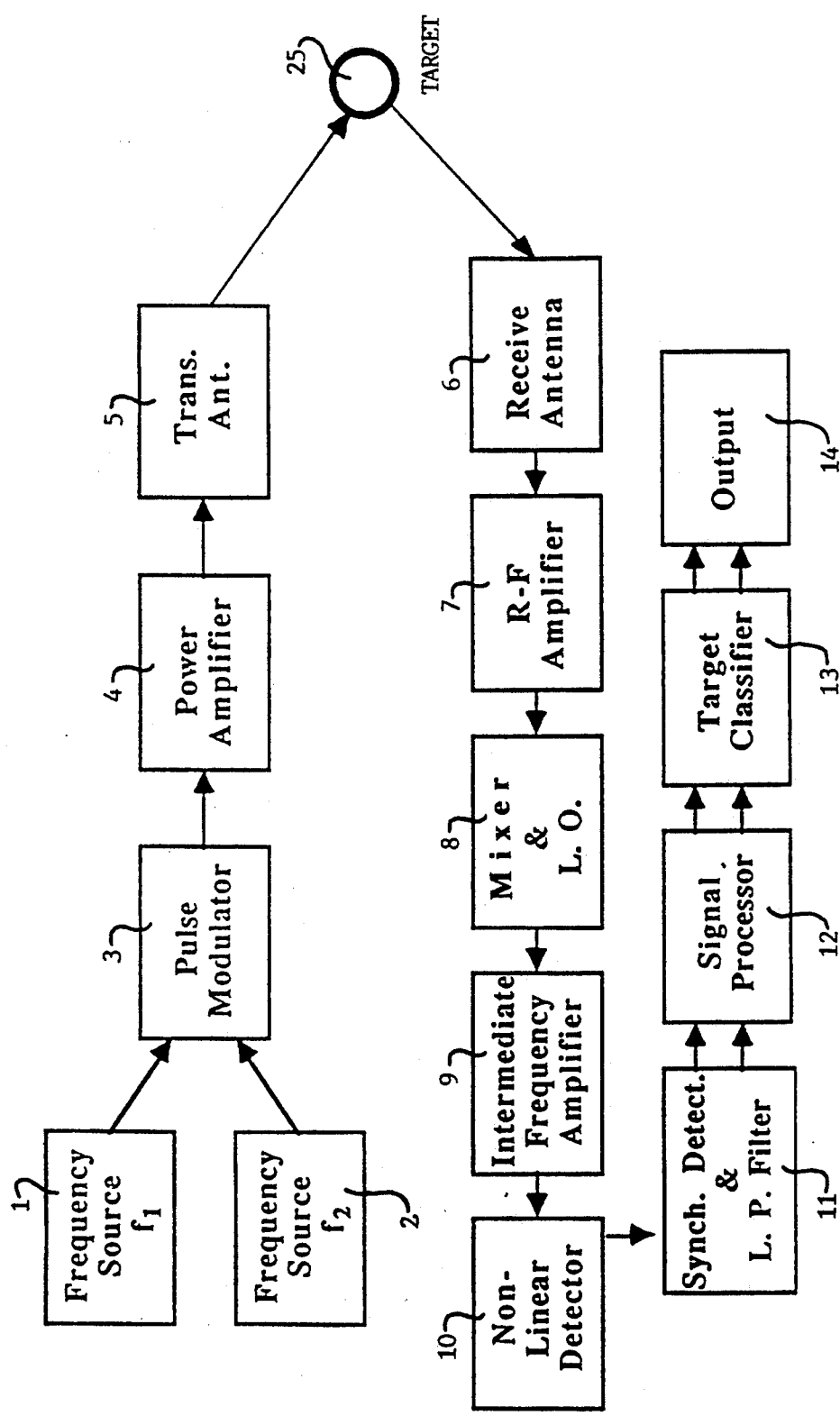
FIG. 1 is a block diagram of a physical embodiment of the present inventive method.

Refer now to FIG. 1 in which a block diagram of a physical embodiment of the present inventive method is shown. In this particular hardware embodiment, two carrier signals, $f_1$ and $f_2$ are generated by frequency source 1 and frequency source 2 respectively. It is desirable that one of these signals, either $f_1$ or $f_2$, be frequency variable and that signals $f_1$ and $f_2$ be coherent. Thus, signals $f_1$ and $f_2$ could be generated by phase-locked oscillators, or by a double-sideband (suppressed carrier) modulators. These two signals, $f_1$ and $f_2$, having a difference frequency of $\Delta f_t$ are then coupled to pulse modulator 3 which converts the c-w $f_1$ and $f_2$ signals into pulses, of 1 microsecond in duration (typically), and at a PRF of 100 pulses/sec to 10,000 pulses/sec. The dual-frequency pulsed signal emerging from pulse modulator 3 is then amplified by power amplifier 4 to a level of several thousand watts, peak power. The amplified dual-frequency pulsed signal emerging from power amplifier 4 is fed to antenna 5 and then radiated outward by antenna 5 towards target 25.

Upon reception by antenna 6 (which can be a separate or a common antenna), the reflected dual-frequency signal is first amplified by R-F amplifier 7, then downconverted by mixer/local oscillator 8 producing an intermediate dual-frequency signal of several Mhz. This intermediate dual-frequency signal is then amplified by IF amplifier 9 up to the neighborhood of 1 milli-watt. The amplified intermediate dual-frequency signal is then detected by a non-linear (e.g., square-law) detector 10. The function of detector 10 is to generate a cross-product between the two carrier frequencies $f_1$ and $f_2$, which can then be low-pass filtered to extract a shifted difference frequency $\Delta f_r$. The shifted difference frequency $\Delta f_r$ signal is again detected by a synchronous detector 11 which contains a replica of the original difference frequency $\Delta f_t$ used in the transmitter. The resulting quadrature signals I and Q are then fed into signal processor 12, or stored for later processing. The purpose of signal processor 12 is to extract other parameters from the reflected dual-frequency signal, such as mean-power, variance, two-frequency autocorrelation function, or Doppler shift (from which target velocity can be determined). Target classifier 13 performs the function of determining target characteristics and/or clutter suppression. Output device 14 comprises readout of target signal strength, velocity and category (e.g., large, small length, singular or diffuse target-return).

As an example, assume that frequency source 1 generates a frequency of 10,000 Mhz and that frequency source 2 generates a signal that is 0.5 Mhz lower in frequency than source 1, thus $\Delta f_t = 0.5$ Mhz. Pulse modulator 3 then converts these continuous signals into 1.0 microsecond rectangular pulses at a rate of 1000/sec. After amplification by power amplifier 4 to 10 kw, this dual-frequency pulsed signal is radiated into space towards target 25. Upon reflection from target 25, the shifted dual-frequency is received by antenna 6, amplified by amplifier 7 and mixed by mixer/local oscillator 8 to produce an IF signal of 60 MHz which is amplified by IF amplifier 9. Non-linear detector 10 then extracts the shifted 0.5 MHz difference frequency ($\Delta f_r$), which is then synchronously detected by detector 11 using a replica of the original 0.5 Mhz signal ($\Delta f_t$). The in-phase and quadrature outputs of detector 11 can then be used to extract velocity and other information in a conventional manner by processor 12 and target classifier 13. If a single-frequency pulsed signal was transmitted (as with a conventional system), this two-frequency information would not exist.

Figure 2:
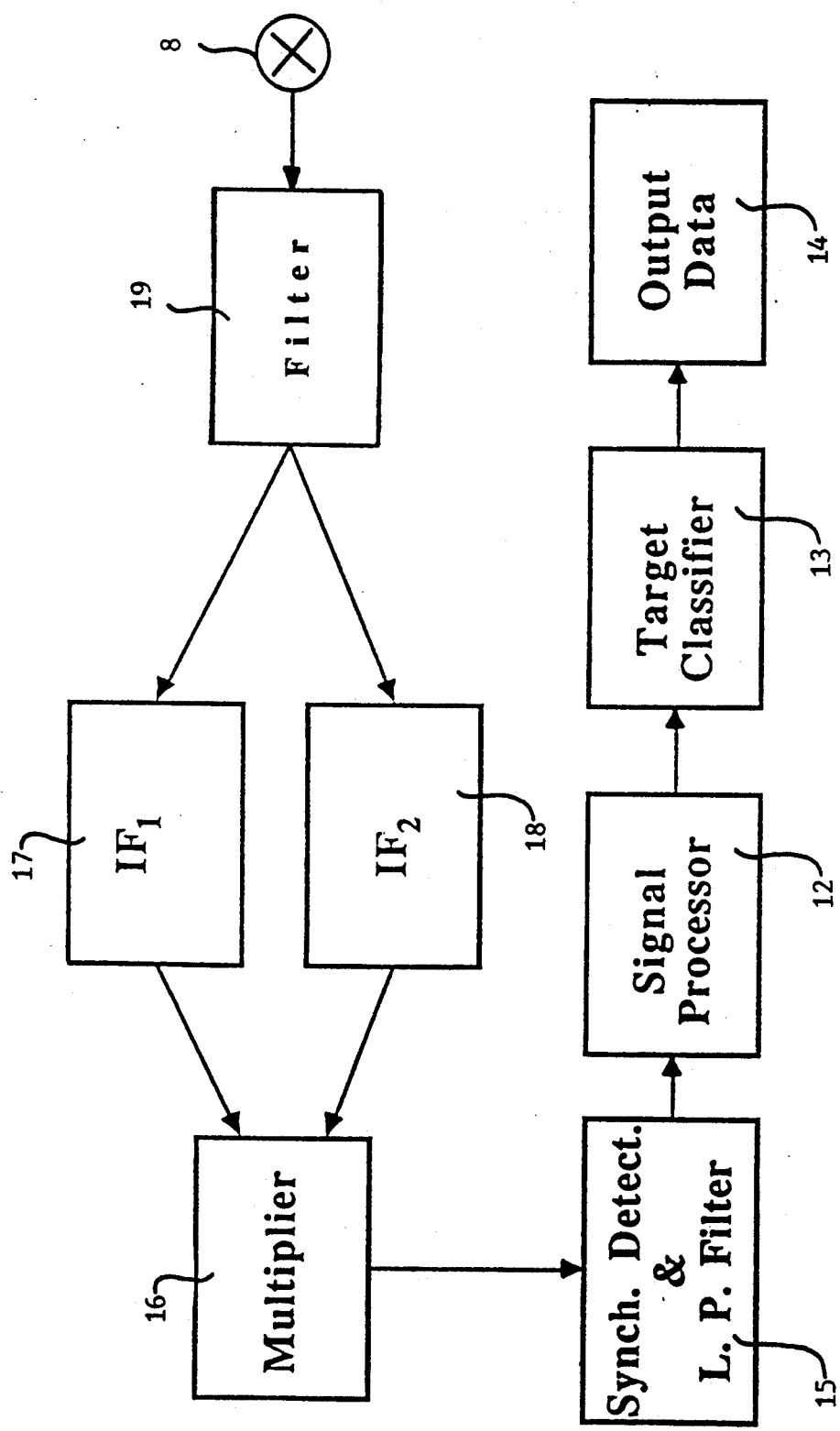
FIG. 2 is a block diagram of another physical embodiment of the present inventive method.

The embodiment shown in FIG. 1 is best for cases in which the difference frequency $\Delta f_t$ is such that the two pulse-spectra overlap. For other cases, it is desirable to separately filter signals $f_1$ and $f_2$ and to then explicitly multiply these two together. Separation of the signals $f_1$ and $f_2$ into two channels allows any noise that exists in frequencies between the two signals to be excluded. This embodiment is shown in FIG. 2. The reflected dual-frequency signal is mixed by mixer 8 with unwanted signals excluded by filter 19. The two signals are then amplified by IF amplifiers 17 and 18. After multiplication by multiplier 16 and low-pass filtering by filter 15, the processing is identical so that previously discussed beginning at signal processor 12 of FIG. 1.

An example of the above would be if two scatterers exist separated by one-quarter the r-f wavelength, the two-way phase shift is one-half wavelength, and the first null in the two-frequency autocorrelation function occurs. The range expanse expression is $R = cT/2$, where R is the range expanse of the target, c is the velocity of light, and T is the pulse length for which distributed radar returns exist (e.g., precipitation). For compact returns (e.g., aircraft), the range expanse is simply the radial target length. If frequency separability (filtering) applies, then conventional techniques are usable, albeit ambiguous. Note that coherence and separability are conflicting requirements in the distributed target case. Uniqueness of the technique resides in finite coherence over the difference-frequency separation.

The frequency sensitivity of the radar target can be used to infer other target properties. This is conventionally done through use of very short-pulse or impulse radars; however, this entails a severe penalty in detection sensitivity or use of very high radiated power. If the frequency difference is varied in the above discussed (closely spaced) two-frequency transmission, the equivalent short-pulse information can be obtained. That is, the two-frequency autocorrelation function is measured; which is the Fourier transforms of the target impulse response.

Radar target information usually comprises echo delay to measure range and Doppler shift to measure velocity. This concept relates to situations in which the radar target can appear as either a point-target or a diffuse collection of extended scatterers. These target categories may exist either separately or in combination, for applications such as meteorological, aircraft traffic control, or military radar observations. Thus, examination of the reflected signal's two-frequency behavior provides information regarding physical properties of the scattering region; such as the presence of more than one target species.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A method for resolving range and doppler target ambiguities when either substantial range to target exists or a high relative velocity of the target exists comprising the steps of:

generating a first signal;

generating a second signal which is coherent with said first signal but at a slightly different frequency such that there exists a difference in frequency between these two signals of $\Delta f_t$;

modulating said first and second signals such that said first and second signals are converted into a dual-frequency pulsed signal;

amplifying said dual-frequency pulsed signal;

transmitting said dual-frequency pulsed signal towards said target;

receiving a reflected dual-frequency signal from said target;

amplifying said reflected dual-frequency signal;

producing an intermediate dual-frequency signal from said amplified reflected dual-frequency signal;

amplifying said intermediate dual-frequency signal;

extracting a shifted difference frequency $\Delta f_r$ from said amplified intermediate dual-frequency signal;

generating two quadrature signals from said difference frequency $\Delta f_t$ and said shifted difference frequency $\Delta f_r$; and processing said two quadrature signals to determine range and doppler information of said target.

2. The method of claim 1 further comprising the steps of:

filtering said amplified reflected dual-frequency signal;

producing two intermediate dual-frequency signals from said filtered amplified reflected dual-frequency signal;

multiplying said two intermediate dual-frequency signals prior to extracting a shifted difference frequency $\Delta f_r$.

3. A device for resolving range and doppler target ambiguities when either the device or the target has substantial range or velocity comprising:

means for generating a first signal;

means for generating a second signal which is coherent with said first signal but at a slightly different frequency such that there exits a difference in frequency between these two signals of $\Delta f_t$;

means for modulating said first and second signals such that said first and second signals are converted into a dual-frequency pulsed signal;

means for amplifying said dual-frequency pulsed signal;

antenna means for transmitting said dual-frequency pulsed signal towards said target;

means for receiving a reflected dual-frequency signal from said target;

means for amplifying said reflected dual-frequency signal;

means for producing an intermediate dual-frequency signal from said amplified reflected dual-frequency signal;

means for amplifying said intermediate dual-frequency signal;

means for extracting a shifted difference frequency $\Delta f_r$ from said amplified intermediate dual-frequency signal;

detector means for generating two quadrature signals from said difference frequency $\Delta f_t$ and said shifted difference frequency $\Delta f_r$; and means for processing said two quadrature signals to determine range and doppler information of said target.

4. The device of claim 3 wherein said means for generating said first and second signals comprises a pair of phase-locked oscillators.

5. The device of claim 3 wherein said means for generating said first and second signals comprises a double-sidebanded modulator.

6. The device of claim 3 wherein said means for modulating comprises means for producing a dual-frequency pulsed signal having a duration of 1 microsecond and a pulse repetition frequency in the range of 100 pulses to 10,000 pulses per second.

* * * * *